Patented Nov. 6, 1934

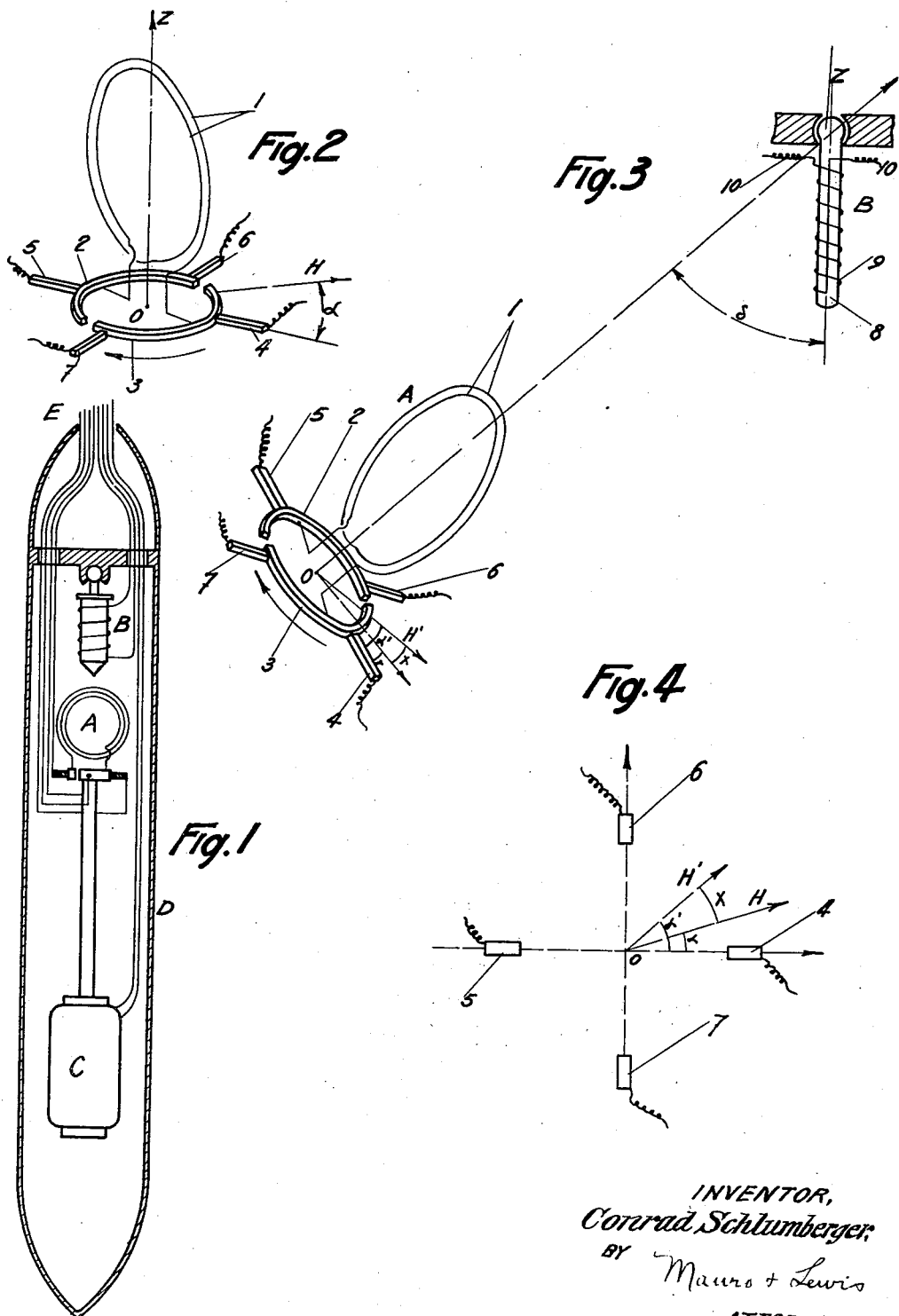

1,980,100

UNITED STATES PATENT OFFICE 1,980,100

ELECTROMAGNETIC PROCESS FOR SURVEYING THE DEVIATIONS OF DRILL HOLES

Conrad Schlumberger, Paris, France, assignor to Société de Prospection Electrique, Procedes Schlumberger, Paris, France, a corporation of France Application January 23, 1932, Serial No. 588,446
In France December 8, 1931

1 Claim. (Cl. 33—205)

Rapid methods of boring, in particular the rotary method, often cause great deviations of the borings from the vertical, the inclination of the bore-hole sometimes exceeding 30°. The result is that in deep borings, such as those undertaken in oil exploration, the bottom of the hole may drift several hundred meters from the vertical passing through the position of the casing head at the surface. It is apparent that it is very important, for many practical applications, to know exactly what the deviation is at different depths, and to be able to plot it graphically, for instance, by establishing its horizontal projection at successive depths, thus showing the curve actually followed by a bore-hole within the ground.

The surveying of the deviation requires the measurement of the two following parameters:

1. The angle of inclination $\delta$ of the axis of the hole with the vertical.
2. The azimuth $\phi$ of the horizontal projection of the axis of the hole with the direction of the north.

With a knowledge of these two parameters at a series of increasing depths, for example every 50 metres, it is easy to plot the above mentioned graph of deviation, provided it is assumed that the bore-hole is approximately rectilinear between two consecutive measuring points, which, with points fairly near each other, is a satisfactory assumption for all practical purposes.

The method of measurement covered by the present invention makes it possible to obtain simultaneously the angle $\delta$ and the azimuth $\phi$ of the deviation. As the measuring arrangements used in this method may be easily moved along the bore-hole, and as the measurements only take a few minutes at each point, this method makes it possible to plot the graph of the deviation very rapidly.

This method is based on the use of an induction compass driven by an electric motor and on the measurement of the electromotive forces of induction which take place in this compass either by the action of the terrestrial magnetic field, or by the action of a small magnetized pendulum suspended in such a manner as to remain permanently vertical.

Fig. 1 is a sectional view of the apparatus for carrying out the invention;

Fig. 2 shows in perspective and diagrammatically the induction compass;

Fig. 3 shows the same, likewise in perspective and diagrammatically, in conjunction with the pendulum;

Fig. 4 is an explanatory diagram.

The induction compass A, the pendulum B and the driving motor C are enclosed in a water tight casing D, having for example the form of a long cylindrical tube, which is lowered into the bore-hole. The entire apparatus thus constituted is attached to a cable E comprising several insulated conductors. Some of these conductors serve for transmitting from the surface the electric currents necessary to drive the motor C and to magnetize the pendulum B; others serve for observing the electromotive forces induced in the compass A. These measurements are carried out at the surface of the ground by means of an arrangement comprising a potentiometer (not shown). The cable E is wound on a winch, by means of which (not shown) the apparatus is lowered or raised in the bore-hole.

Referring to Figure 2 the induction compass comprises essentially a coil 1, on which are wound a large number of loops (of which only two are shown in the figure) which coil rotates uniformly and rapidly around an axis OZ. If this rotating coil is in a stationary magnetic field, such as the terrestrial magnetic field, an alternating electromotive force which is sinusoidal in relation to time is induced in it. In order to observe this electromotive force, the two ends of the coil on the frame 1 are soldered to the two segments 2 and 3 of a collector which rotates with the frame. Two pairs of brushes, 4—5 and 6—7 fixed to the framework (not shown) of the inductive compass and consequently stationary in space make contact with the collector. These two sets of brushes 4—5 and 6—7 are at right angles to each other. By means of a direct current potentiometer the difference of potential $V_1$ between the brushes 4 and 5 and the difference of potential $V_2$ between the brushes 6 and 7 are measured. As the rotation of the compass is rapid and the needle of the potentiometer slow, the reading obtained is the mean value of the above mentioned difference of potentials during a complete period of rotation. This mean value depends, as is known, on the orientation of the magnetic induction vector with reference to the line of the brushes under consideration. Referring to Fig. 2 if $\alpha$ is the angle between the line of brushes 4, 5 and the projection H of the magnetic vector of the terrestrial magnetic field on the plane of the collector 2, 3, we have:

$$\tang \alpha = \frac{V_1}{V_2} \quad (1)$$

and the value of the projection of this vector is given by the formula:

$$H = K\sqrt{V_1^2 + V_2^2} \quad (2)$$

in which K is a coefficient dependent on the rotating speed and on the constants of the induction compass, such as number and surface of the loops constituting the coil.

It will thus be seen that the potentiometer measurements carried out by means of the induction compass rotating in a magnetic field make it possible to determine the direction and magnitude of the component of this field in the plane of the collector of the compass, that is to say in a plane perpendicular to the axis of rotation of the coil.

Fig. 3 shows the system formed by the compass A and the magnetized pendulum B. The axis of rotation OZ of the compass is supposed to have a certain inclination with regards to the vertical. The pendulum hangs immediately above the induction compass A. It is constituted by a soft iron bar 8 enclosed in a solenoid 9 and suspended freely from the framework of the apparatus by a Cardan joint at a fixed point Z situated on the extension of the axis of rotation OZ of the coil. A current is sent from the surface into the solenoid 9 through very flexible leads 10 which do not prevent the pendulum from constantly maintaining its vertical position. This current has a fixed intensity, say for example one ampere, to give to the pendulum a certain magnetization of a known value. The pendulum B when magnetized creates in the region of the induction compass A a magnetic field which is superposed on the permanent terrestrial field. This additional magnetic field acts to a greater or less extent on the compass according to the relative positions of the pendulum and compass, in other words according to the angle of inclination $\delta$ of the axis of rotation OZ of the coil with the vertical.

By means of the potentiometric arrangement already referred to one measures the increase $V_1'$ of the potential difference, which is produced between the brushes 4 and 5 of the compass when the magnetizing current is passed through the solenoid enclosing the pendulum. Before this current is passed the compass is only influenced by the action of the terrestrial field, which is constant. $V_1'$ then corresponds to the action of the additional field in question. Similarly the increase $V_2'$ of the difference of potential between the brushes 6 and 7 is measured. The two following relations (3) and (4) are thus obtained. They are similar to those (1) and (2) relating to the terrestrial field:

$$\tang \alpha' = \frac{V_1'}{V_2'} \quad (3)$$

$$H' = K\sqrt{(V_1')^2 + (V_2')^2} \quad (4)$$

In these relations H' is the projection, on a plane perpendicular to the axis of rotation of the coil, of the magnetic vector caused by the magnetized pendulum in the region of the compass, i. e. at the centre of the frame; and $\alpha'$ is the angle between the line of brushes 4—5 and the projection of the vector. The magnitude and direction of H' are thus determined. K is the same coefficient as in Equation (2) above.

Figure 4 shows in the plane perpendicular to the axis of rotation of the coil the two vectors H and H' whose fluxes produce the induced electromotive forces, and the two directions 4—5 and 6—7 of the lines of brushes at right angles to each other.

It results from the foregoing that the four potential measurements $V^1$, $V^2$, $V^1{}'$ and $V^2{}'$ make it possible to obtain the following two parameters:

1. The angle X between the two vectors H and H' which is given by the expression $$\tang X = \tang(\alpha' - \alpha) = \frac{V_2 \cdot V_1' - V_1 \cdot V_2'}{V_1 \cdot V_1' + V_2 \cdot V_2'} \quad (5)$$

2. The value Y of the ratio between these two vectors.

$$Y = \frac{H'}{H} = \sqrt{\frac{(V_1')^2 + (V_2')^2}{(V_1)^2 + (V_2)^2}} \quad (6)$$

These two parameters X and Y are independent of the values of the constant rotating speed of the coil, and of the angle $\alpha$ between the terrestrial vector H and the line of brushes 4—5, which are fixed on the framework of the apparatus.

Let us sink the apparatus in a straight drill hole having a given inclination $\delta$ in a certain azimuth $\phi$ to the magnetic North. As the whole apparatus has a long cylindrical form, the axis of rotation OZ of the induction compass remains parallel to the axis of the hole. The two parameters X and Y take each a definite value, which remains the same for every position of the apparatus inside the hole. In particular the apparatus, when lowered from one measuring station to another, may without altering the values of X and Y revolve around its axis, as it necessarily does, being suspended on a single cable. In other words, the above Formulæ (5) and (6) give always for X and Y the same results, although the individual values of $V^1$, $V^2$, which depend upon angles $\alpha$ and $\alpha'$ are modified by the rotation of the whole apparatus (and therefore of the line of brushes 4—5) during the displacements from one measuring station to the other inside the drill hole.

If the apparatus is sunk in a crooked hole its angle of inclination $\delta$ and its azimuth $\phi$ vary with the depth. In such case the measurements give different values $X^1$, $Y^1$, $X^2$, $Y^2$, $X^3$, $Y^3$—for the different depths $d^1$, $d^2$, $d^3$—which are recorded on the suspension cable. From these data the actual values $\delta$, $\phi_1$, $\delta_2\phi_2$, $\delta_3\phi_3$ of inclination and azimuth at the corresponding depth may be computed in the manner following, and from the values thus obtained it is easy to plot the graph of deviation of the crooked hole.

The desired values may be computed as follows: The parameters X and Y are, for an apparatus of determined constructional dimensions and details, two functions of $\delta$ and $\phi$; and inversely these two quantities $\delta$ and $\phi$ are two precisely defined functions of X and Y. These last two functions could be calculated theoretically from the constants of the apparatus and of the terrestrial magnetic field. It is preferable, however, to operate experimentally. The apparatus is therefore placed at the surface of the ground in a series of successive positions defined by the values $\delta_1\phi_1$, $\delta_2\phi_2$, $\delta_3\phi_3$ of its inclination and azimuth. For each of these positions the corresponding values $X^1Y^1$, $X^2Y^2$, $X^3Y^3$, are measured exactly in the same way as when surveying a drill hole. These results are entered in the form of a table giving $X^nY^n$ in terms of $\delta_n$ and $\phi_n$. Such a table inversely makes it possible to find the values $\delta_n$ and $\phi_n$ corresponding to the values $X^n$ and $Y^n$, which are experimentally measured when the apparatus is lowered into a drill hole.

It should be noted that the table must be established in the same geographical region in which holes are to be surveyed, in order to avoid errors due to modifications of the terrestrial magnetic field in intensity and inclination from one region to another.

Uniformity of the terrestrial magnetic field inside the drill hole is necessary to obtain correct results. Therefore the device works satisfactorily only in the uncased part, since a steel casing modifies and almost suppresses the magnetic field in the hole.

What I claim is:

An apparatus adapted to be lowered into a drill hole for determining at a given depth the angle of inclination of the hole from the vertical and the azimuth of said inclination with respect to the magnetic North at the given depth, said apparatus comprising an induction compass having two pairs of brushes disposed at right angles to each other; means for rotating the coil of said compass uniformly around an axis parallel to the axis of the hole; a magnetized pendulum and means for freely suspending the same at a point on the prolongation of the axis of rotation of said coil, so that the electromotive forces induced in the coil respectively by the earth's magnetic field and by the magnetized pendulum are measured by the changes in potential produced between the two brushes of each pair of brushes of the compass, the inclination and the azimuth of the drill hole being determinable from said latter data; and means for communicating between said apparatus and suitable measuring devices at the surface.

CONRAD SCHLUMBERGER.